(12) United States Patent
Takano et al.

(10) Patent No.: US 9,989,712 B1
(45) Date of Patent: Jun. 5, 2018

(54) MPO CONNECTOR ASSEMBLY WITH PUSH-PULL TAB

(71) Applicant: Senko Advanced Components, Inc., Marlborough, MA (US)

(72) Inventors: Kazuyoshi Takano, Southborough, MA (US); Neal Ho Man Ming, Kowloon (HK)

(73) Assignee: Senko Advanced Components, Inc, Marlborough, MA (US)

( * ) Notice: Subject to any disclaimer, the term of this patent is extended or adjusted under 35 U.S.C. 154(b) by 0 days. days.

(21) Appl. No.: 15/463,275

(22) Filed: Mar. 20, 2017

(51) Int. Cl.
*G02B 6/38* (2006.01)

(52) U.S. Cl.
CPC ......... *G02B 6/3893* (2013.01); *G02B 6/3825* (2013.01); *G02B 6/3887* (2013.01)

(58) Field of Classification Search
CPC .................................................. G02B 6/3893
See application file for complete search history.

(56) References Cited

U.S. PATENT DOCUMENTS

| 8,559,781 B2 | 10/2013 | Childers et al. |
| 9,052,474 B2 | 6/2015 | Jiang et al. |
| 2016/0370545 A1* | 12/2016 | Jiang .................... G02B 6/3893 |

* cited by examiner

*Primary Examiner* — Omar R Rojas
(74) *Attorney, Agent, or Firm* — Edward S. Jarmolowicz

(57) ABSTRACT

An optical fiber connector assembly comprising an MPO connector and a push-pull tab. The connector may have an outer housing and an inner housing extending beyond a rear end of the outer housing, the outer housing having a first protrusion and the inner housing having a second protrusion positioned at a distance from the first protrusion. The push-pull tab may comprise a main body and an extender coupled to the main body, the main body having a plurality of walls forming a passageway configured to receive the connector, the plurality of walls including a first wall having a window sized according to the distance between the first and second protrusions and configured to receive the first and second protrusions. In another embodiment, the push-pull tab may comprise a first piece and a second piece configured to couple to each other to form a passageway for receiving the connector.

9 Claims, 19 Drawing Sheets

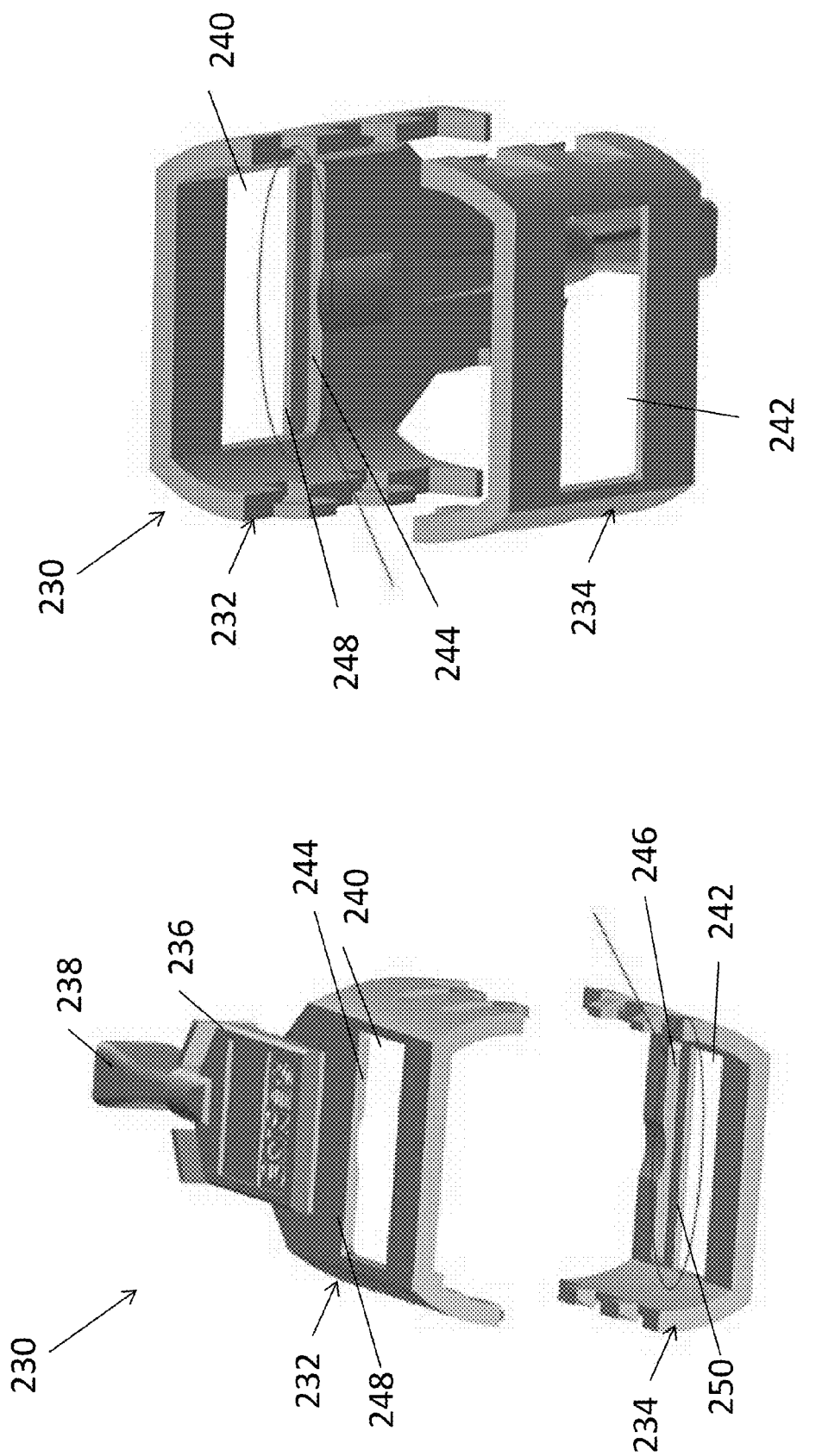

MPO CONNECTOR ASSEMBLY WITH PUSH-PULL TAB

BACKGROUND

The present disclosure relates generally to optical fiber connectors, and more specifically to optical fiber connectors having push-pull tabs.

The prevalence of the Internet has led to unprecedented growth in communication networks. Consumer demand for service and increased competition has caused network providers to continuously find ways to improve quality of service while reducing cost.

Certain solutions have included deployment of high-density interconnect panels. High-density interconnect panels may be designed to consolidate the increasing volume of interconnections necessary to support the fast-growing networks into a compacted form factor, thereby increasing quality of service and decreasing costs such as floor space and support overhead.

In communication networks, such as data centers and switching networks, numerous interconnections between mating connectors may be compacted into high-density panels. Panel and connector producers may optimize for such high densities by shrinking the connector size and/or the spacing between adjacent connectors on the panel. However, in a high-density panel configuration, adjacent connectors and cable assemblies may obstruct access to the individual connectors. Such physical obstructions may impede the ability of an operator to insert and remove cables and the connectors.

SUMMARY

According to one aspect of the present disclosure, there is provided an optical fiber connector assembly comprising a connector having an outer housing and an inner housing, the inner housing extending beyond a rear end of the outer housing, the outer housing having a first protrusion and the inner housing having a second protrusion positioned at a distance from the first protrusion. The optical fiber connector assembly further comprises a push-pull tab having a main body and an extender coupled to the main body. The main body has a plurality of walls forming a passageway configured to receive the connector. The plurality of walls includes a first wall having a window sized according to the distance between the first protrusion and the second protrusion and configured to receive the first protrusion and the second protrusion so as to couple the main body to the outer housing and the inner housing.

In various embodiments, the connector may be an MPO connector. In some embodiments, the first protrusion and the second protrusion may be configured to snap into the window so as to lock the push-pull tab to the connector. In some embodiments, the first protrusion and the second protrusion may be substantially parallel. In some embodiments, the first protrusion and the second protrusion may be oriented in a direction substantially orthogonal to a longitudinal axis of the connector.

In some embodiments, the first wall may form a top portion of the push-pull tab, and the plurality of walls may further include two side walls. In various embodiments, the main body may be a single integral structure.

In various embodiments, the push-pull tab may further comprise at least one thin wall configured to push against the second protrusion of the inner housing to prevent a transverse movement of the push-pull tab when the push-pull tab is pushed.

In some embodiments, the optical fiber connector assembly may further comprise a boot coupled to the connector. The extender may be configured to extend over the boot. In one example, the boot may have a length of about 5.5 mm. In some embodiments, the extender may be coupled to a rear portion of the main body.

According to another aspect, there is provided an optical fiber connector assembly comprising a connector having an outer housing and an inner housing, the inner housing extending beyond a rear end of the outer housing, the outer housing having a first protrusion and the inner housing having a second protrusion positioned at a distance from the first protrusion. The optical fiber connector assembly further comprises a push-pull tab comprising a first piece and a second piece configured to couple to each other so as to form a passageway for receiving the connector. The push-pull tab further comprises an extender coupled to one of the first piece and the second piece, at least one of the first piece and the second piece having a window sized according to the distance between the first protrusion and the second protrusion and configured to receive the first protrusion and the second protrusion so as to couple the push-pull tab to the outer housing and the inner housing. The connector may be an MPO connector.

In various embodiments, the first protrusion and the second protrusion may be configured to snap into the window so as to lock the push-pull tab to the connector. The first protrusion and the second protrusion may be substantially parallel. The first protrusion and the second protrusion may be oriented in a direction substantially orthogonal to a longitudinal axis of said connector.

In some embodiments, the optical fiber connector assembly may further comprise a boot coupled to the connector. The extender may be configured to extend over the boot. In one example, the boot may have a length of about 5.5 mm. In some embodiments, the extender may be coupled to a rear portion of one of the first piece and the second piece.

In some embodiments, the first piece may include a plurality of tabs and the second piece may include a plurality of openings, the plurality of tabs being configured to snap into the plurality of openings so as to lock the first piece to the second piece. In some embodiments, the first piece may include a first plurality of side walls having the plurality of tabs thereon, and the second piece may include a second plurality of side walls having the plurality of openings thereon.

In various embodiments, the window may have a first side wall configured to pull the first protrusion when the push-pull tab is pulled. The window may have a second side wall configured to push the second protrusion when the push-pull tab is pushed.

In some embodiments, the push-pull tab may comprise a joint coupling the first piece and the second piece.

BRIEF DESCRIPTION OF THE DRAWINGS

FIGS. 11A to 11D are views of one embodiment of a push-pull tab configured to prevent upward/downward movement of the tab as it is pushed, according to aspects of the present disclosure;

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

The following terms shall have, for the purposes of this application, the respective meanings set forth below.

A connector, as used herein, refers to a device and/or components thereof that connects a first module or cable to a second module or cable. The connector may be configured for fiber optic transmission or electrical signal transmission. The connector may be any suitable type now known or later developed, for example, embodiments of multiple-fiber push-on/pull-off (MPO) connectors, such as the Senko mini MPO connector and the Senko MPO Plus connector. The connector may generally be defined by a connector housing body.

A "fiber optic cable" or an "optical cable" refers to a cable containing one or more optical fibers for conducting optical signals in beams of light. The optical fibers can be constructed from any suitable transparent material, including glass, fiberglass, and plastic. The cable can include a jacket or sheathing material surrounding the optical fibers. In addition, the cable can be connected to a connector on one end or on both ends of the cable.

Various embodiments described herein generally provide connector assemblies having optical fiber connectors with push-pull tabs configured to allow a user to easily remove or insert connectors into adapters, such as adapters disposed on a high density panel without damaging surrounding connectors, accidentally disconnecting surrounding connectors, disrupting transmissions through surrounding connectors, and/or the like.

Figure 1:
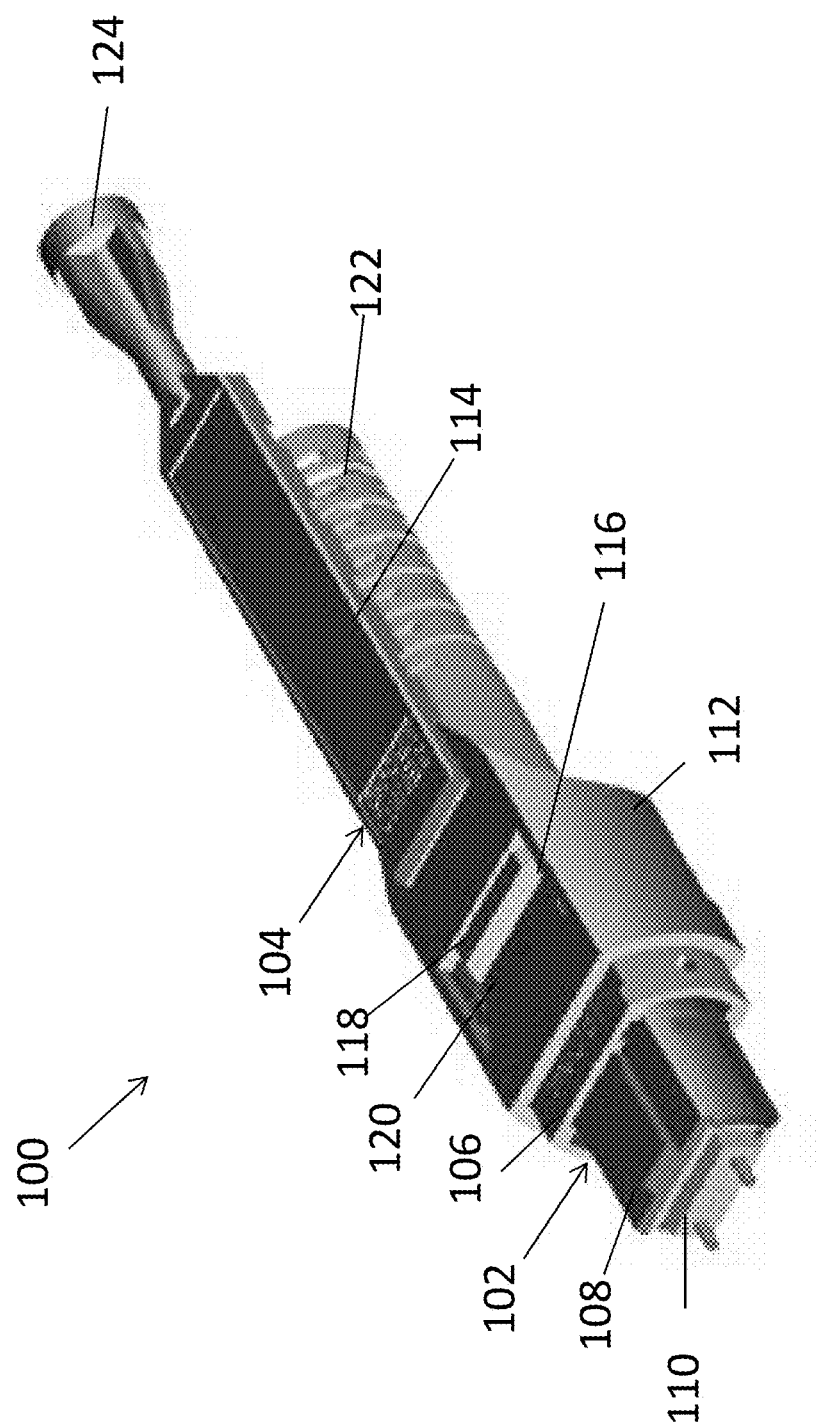
FIG. 1 is a perspective view of one embodiment of an optical fiber connector assembly having a push-pull tab coupled to a mini MPO connector according to aspects of the present disclosure.

FIG. 1 shows one embodiment of an optical fiber connector assembly 100 having a connector 102 and a push-pull tab 104. In this embodiment, the connector 102 is an MPO connector, and specifically a mini MPO connector. The connector 102 has an outer housing 106, an inner housing 108, and an MPO ferrule 110. The push-pull tab 104 includes a main body 112 and an extender 114 coupled to the main body. The push-pull tab 104 is coupled to the connector 102, and specifically to both the outer housing 106 and the inner housing 108. The push-pull tab 104 includes a window 116 configured to receive a plurality of protrusions (e.g. 118, 120) of the outer housing 106 and inner housing 108 so as to snap and lock the push-pull tab to the connector 102, as described further below.

As shown in FIG. 1, the optical fiber connector assembly 100 further comprises a boot 122 coupled to the connector 102. The extender 114 of the push-pull tab 104 may extend over the boot 122. In this embodiment, the boot 122 has a length of about 5.5 mm. In other embodiments, the boot 122 may have a different length. In various embodiments, the length of the extender 114 may be substantially equal to or greater than that the length of the boot 122. The push-pull tab 104 may further comprise a handle 124 positioned at an end thereof. In one example, the length of the push-pull tab may be about 34 mm. In other examples, the length of the push-pull tab may be about 54 mm or about 64 mm. In various embodiments, the push-pull tab may have a length configured to allow easy access to push and pull the tab, such as a length greater than about 30 mm. In various embodiments, the length of the push-pull tab may be selected so as to extend beyond the boot of the connector. For example, the length may be selected such that the handle of the push-pull tab is located beyond the boot of the connector for easy access.

In various embodiments, the push-pull tab 104 may be removable from the optical connector assembly 100 by decoupling it from the connector 102. The push-pull tab 104 may also be re-installed by coupling to the connector 102.

Figure 2:
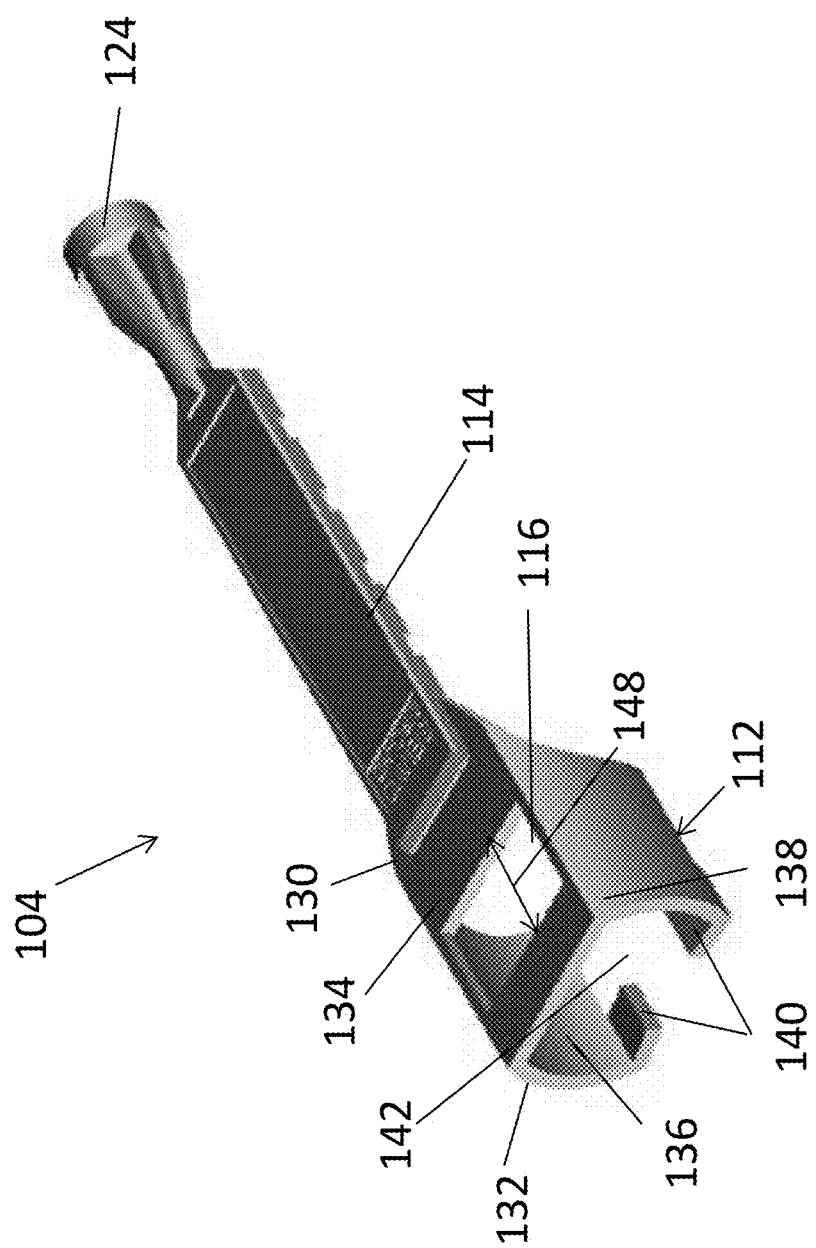
FIG. 2 is a perspective view of the push-pull tab of the connector assembly of FIG. 1 according to aspects of the present disclosure.

FIG. 2 shows the push-pull tab 104 of the connector assembly 100, including the main body 112 and the extender 114. The main body 112 may have a rear portion 130 and a front portion 132. The extender 114 may be coupled to the rear portion 130 of the extender 114, as shown. The push-pull tab may also include a handle 124 coupled to an end of the extender 114.

The main body 112 includes a plurality of walls, including a first wall 134 that forms a top portion of the main body. The plurality of walls also includes two side walls 136 and 138. A plurality of tabs 140 may extend from the side walls 136 and 138, thereby forming a partial wall at the bottom portion that is opposite to the top portion of the main body 112. The plurality of walls may include the partial wall defined by the plurality of tabs 140, and may form a passageway 142 configured to receive the connector 102, for example the outer housing 106 of the connector. The plurality of walls may facilitate coupling of the push-pull tab 104 to the connector 102, for example by gripping the outer housing 106. The side walls 136 and 138 may be configured to flex to allow receiving the connector 102. The top wall 134 of the push-pull tab 104 has a window 116 sized to receive a plurality of protrusions of the connector 102, so as to lock the push-pull tab to the connector.

Figure 3:
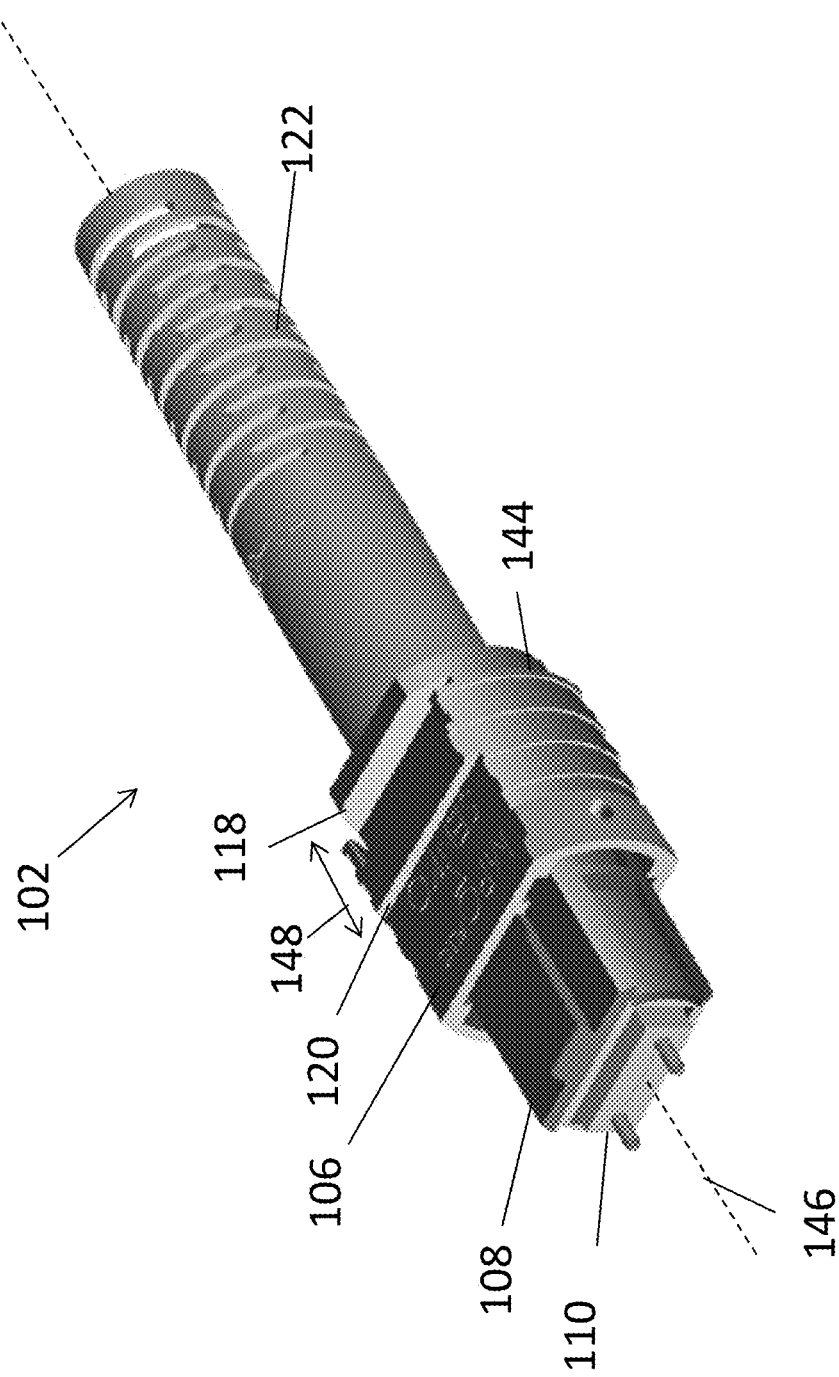
FIG. 3 is a perspective view of the mini MPO connector of FIG. 1, with the push-pull tab removed, according to aspects of the present disclosure.

FIG. 3 shows the connector 100 with the push-pull tab 104 removed. In this embodiment, the connector 100 is an MPO connector, and specifically a mini MPO connector with an MPO ferrule 110. The connector 102 is coupled to a 5.5 mm boot 122. In other embodiments, the boot may have different lengths. The connector 102 has an outer housing 106 and an inner housing 108. The outer housing 106 is disposed around the inner housing 108. Each of the inner housing 108 and the outer housing 106 is centered around a longitudinal axis 146 of the connector 102. As shown in FIG. 3, the inner housing 108 may be longer than the outer housing 106, extending beyond a rear end 144 of the outer housing.

The outer housing 106 has a first protrusion 120 and the inner housing 108 has a second protrusion 118. The second protrusion 118 is positioned at one end of the inner housing 108, beyond the rear end 144 of the outer housing 106. The first protrusion 120 and the second protrusion 118 are substantially parallel to each other, and separated by a distance 148. The first and second protrusions may be oriented in a direction substantially orthogonal to a longitudinal axis 146 of the connector 102. The first protrusion 120 and the second protrusion 118 are also configured to snap into the window 116 of the push-pull tab 104 so as to lock the push-pull tab to the connector 102. Therefore, the window 116 of the connector 102 may be sized according to the distance 148 between the first protrusion 120 and the second protrusion 118, as shown in FIGS. 2 and 3. The window 116 allows the push-pull tab 104 to be coupled to each of the outer housing 106 and the inner housing 108 via the first protrusion 120 and the second protrusion 118.

Figure 4:
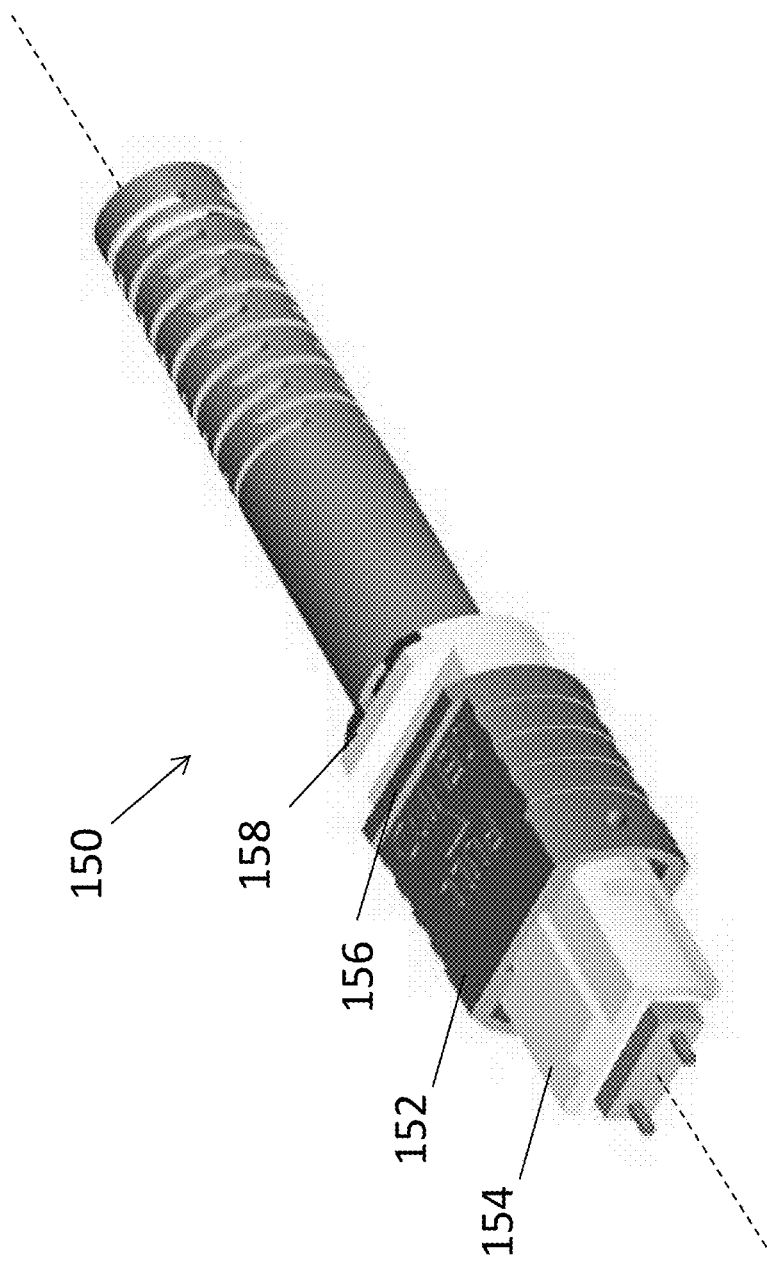
FIG. 4 is a perspective view of another embodiment of an MPO connector configured to receive a push-pull tab according to aspects of the present disclosure.

FIG. 4 shows another embodiment of an MPO connector 150 configured to receive a push-pull tab. In this embodiment, the connector 150 is a Senko MPO Plus connector, having dimensions different from that of the connector 102. Therefore, the connector 150 may be configured to couple to a push-pull tab similar to that of the push-pull tab 104 of FIG. 2, but having different dimensions corresponding to that of the connector 150.

The connector 150 has an outer housing 152 and an inner housing 154. Similar to the embodiment of FIG. 3, the inner housing 154 extends beyond the rear end of the outer housing 152. The outer housing 152 includes a first protrusion 156 and the inner housing 154 includes a second protrusion 158. The first and second protrusions may be substantially parallel to each other, and may be separated by a distance corresponding to the size of a window of the push-pull tab, so as to snap and couple the push-pull tab to the connector 150.

In various embodiments, as illustrated for example in FIG. 2, the main body of the push-pull tab may have a single integral structure. In other embodiments, the entire push-pull tab, including both the main body and the extender may be a single integral structure.

Figure 5:
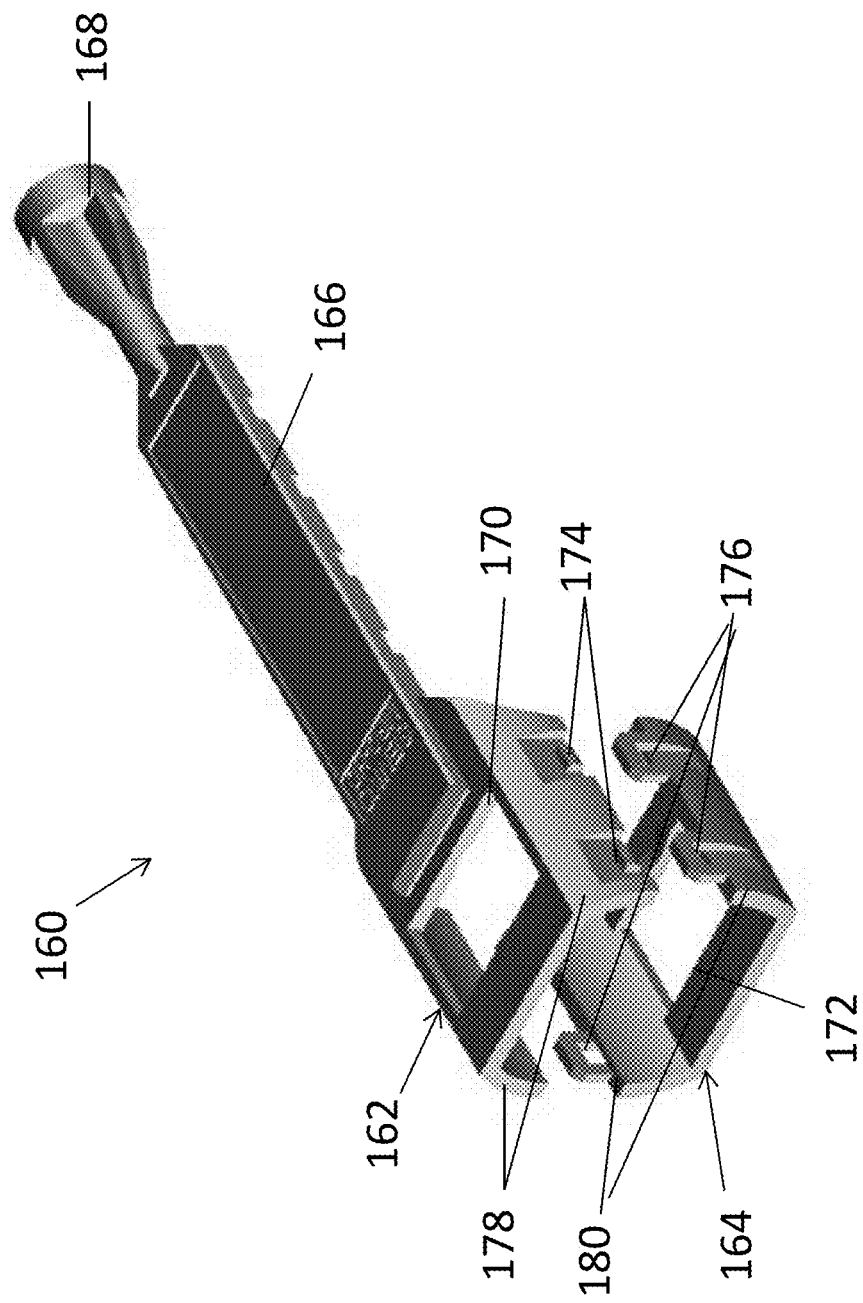
FIG. 5 is a perspective view of a disassembled push-pull tab having two pieces, according to another aspect of the present disclosure.

FIG. 5 shows another embodiment of a push-pull tab 160 having a first piece 162 and a second piece 164. The first piece 162 and the second piece 164 are configured to couple to each other to form a passageway for receiving a connector, such as one of the connectors 102 and 150 of FIGS. 3 and 4. The push-pull tab 160 further comprises an extender 166 coupled to the first piece 162. In other embodiments, the extender 166 may be coupled to the second piece 164. The push-pull tab 160 also includes a handle 168 coupled to the extender 166.

The first piece 162 has a window 170 configured to receive the first and second protrusions of a connector, such as the connector 102 and 150, so as to couple the push-pull tab to the outer housing and the inner housing of the connector. The window 170 is sized according to a distance between the first protrusion and the second protrusion of the corresponding connector. The second piece 164 also has a respective window 172. Similar to the first window 170 positioned at the top portion of the push-pull tab 160, the second window 172 is positioned at the bottom portion of the push-pull tab. The window 172 is also sized to receive respective protrusions positioned at the bottom portion of the connector, on the inner and outer housings. In this embodiment, the push-pull tab 160 has two windows on opposite sides of the push-pull tab. In other embodiments, one of the first piece or the second piece may have a window for coupling to the inner and outer housings of the connector.

The first piece 162 further includes a plurality of tabs 174, and the second piece 164 includes a plurality of openings 176, the plurality of tabs 174 being configured to snap into the plurality of openings 176 so as to lock the first piece to the second piece. Specifically, the first piece 162 includes a first plurality of side walls 178 having the plurality of tabs 174 thereon, and the second piece 164 includes a second plurality of side walls 180 having the plurality of openings 176 thereon. In other embodiments, the second piece may include the plurality of tabs and the first piece may include the plurality of openings. In yet other embodiments, each of the first piece and the second piece may have at least one tab and at least one opening configured to couple with a respective tab and opening of the other piece.

Various features described above in relation to the single piece push-pull tab 104 may also be included in the two piece push-pull tab 160.

Figure 6:
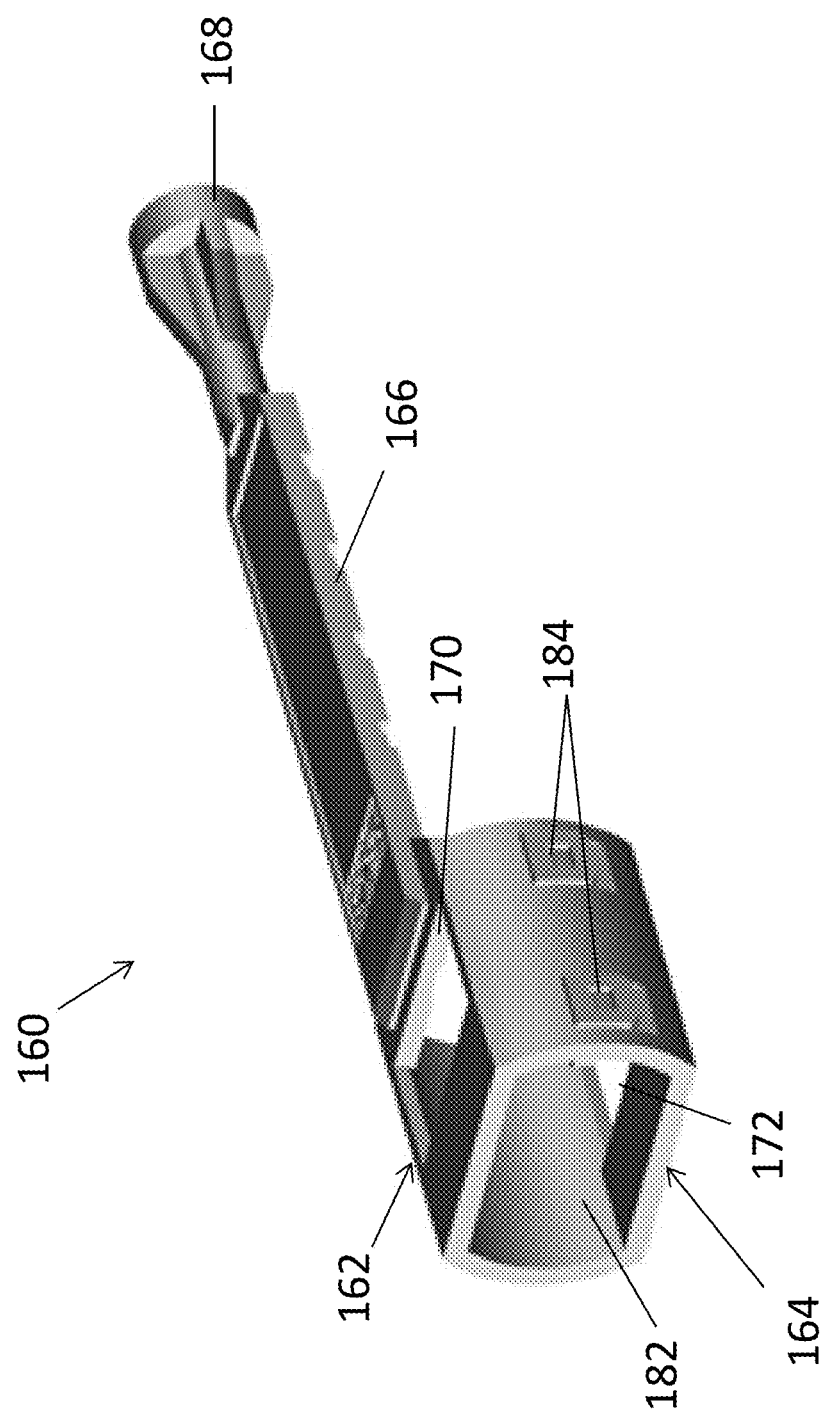
FIG. 6 is a perspective view of the assembled push-pull tab of FIG. 5, according to aspects of the present disclosure.

FIG. 6 is an assembled view of the push-pull tab 160, showing the plurality of locks 184 formed when the plurality of tabs 174 snap into the plurality of openings 176 shown in FIG. 5. The locks 184 lock the first piece 162 to the second piece 164, thereby forming a passageway 182 through the push-pull tab 160. The passageway 182 is configured to receive an MPO connector, for example one of the connectors 102 and 150.

Figure 7:
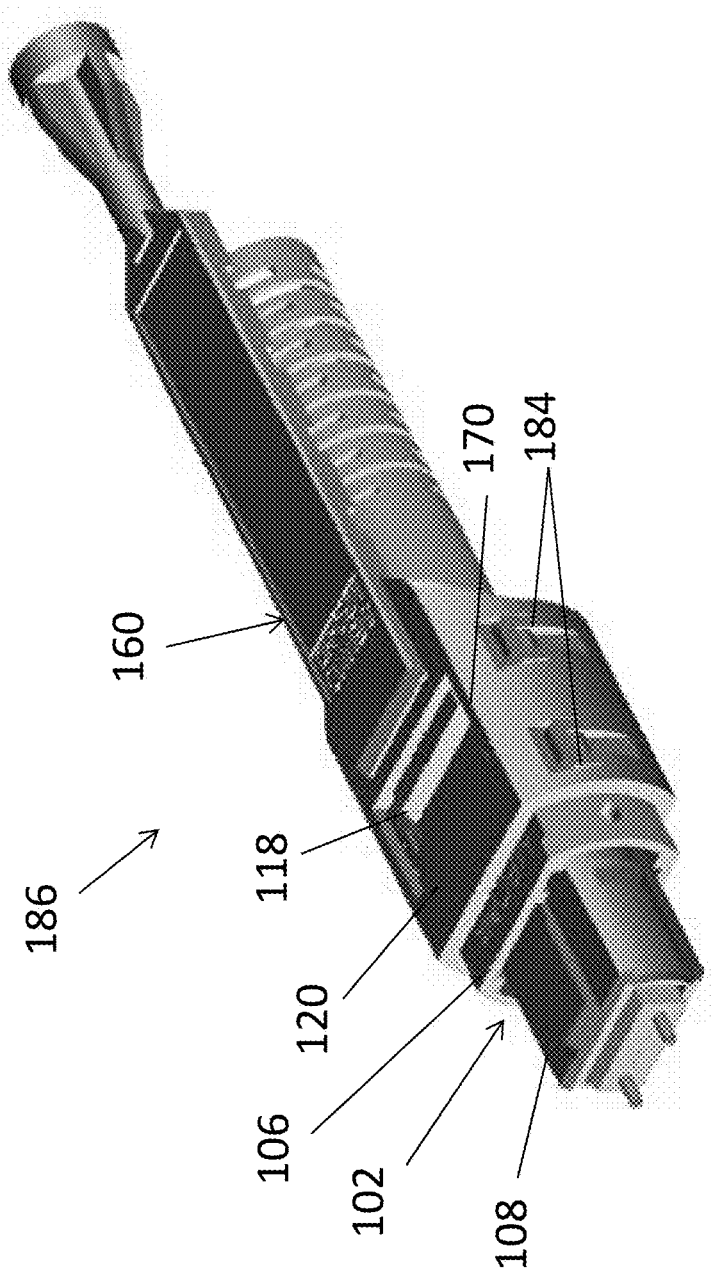
FIG. 7 is a perspective view of one embodiment of a connector assembly having the push-pull tab of FIG. 5 coupled to a mini MPO connector according to aspects of the present disclosure.

FIG. 7 shows one embodiment of a connector assembly 186 having the push-pull tab 160 coupled to the mini MPO connector 102. The locks 184 couple the two pieces of the push-pull tab 160, and the protrusions 118 and 120 of the connector 102 are snapped into the window 170, thereby coupling the push-pull tab to each of the outer housing 106 and the inner housing 108.

Figure 8:
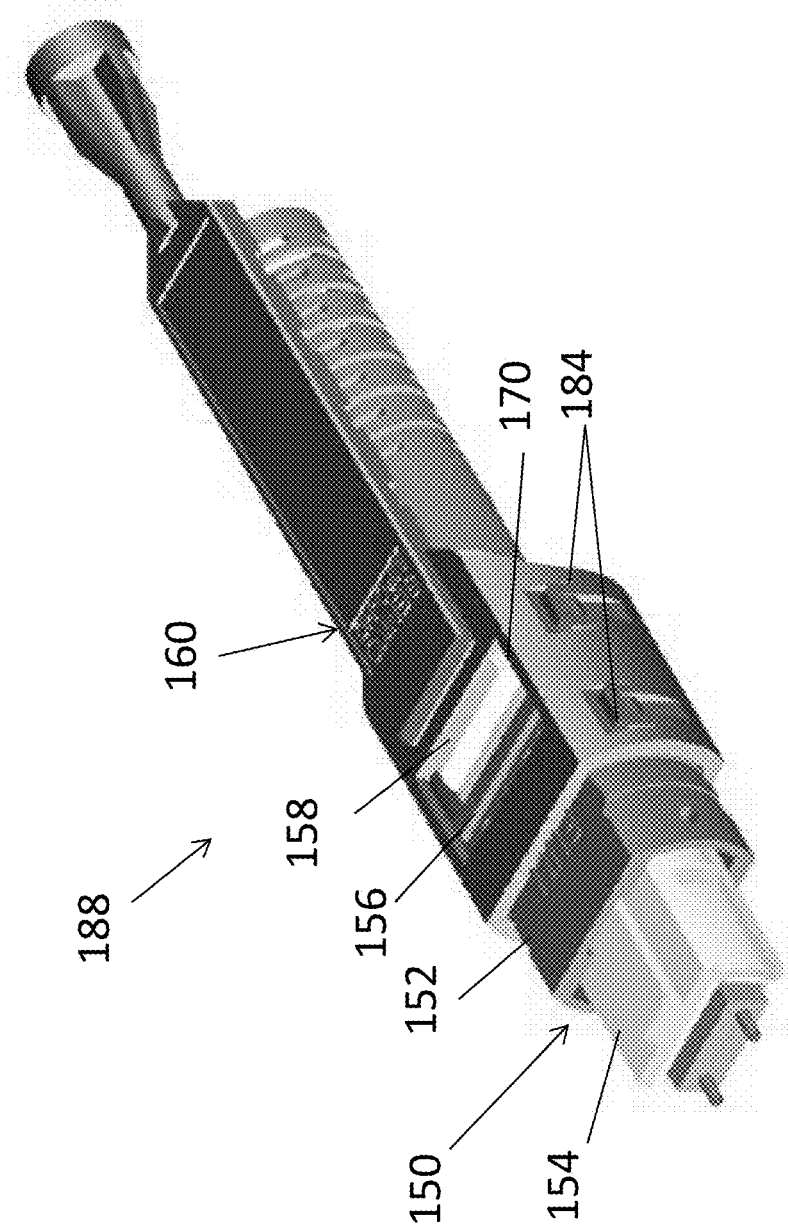
FIG. 8 is a perspective view of another embodiment of a connector assembly having the push-pull tab of FIG. 5 coupled to an MPO connector according to aspects of the present disclosure.

FIG. 8 shows another embodiment of a connector assembly 188 having the push-pull tab 160 coupled to the Senko MPO Plus connector 150. The locks 184 couple the two pieces of the push-pull tab 160, and the protrusions 156 and 158 of the connector 150 are snapped into the window 170, thereby coupling the push-pull tab to each of the outer housing 152 and the inner housing 154.

Figure 9:
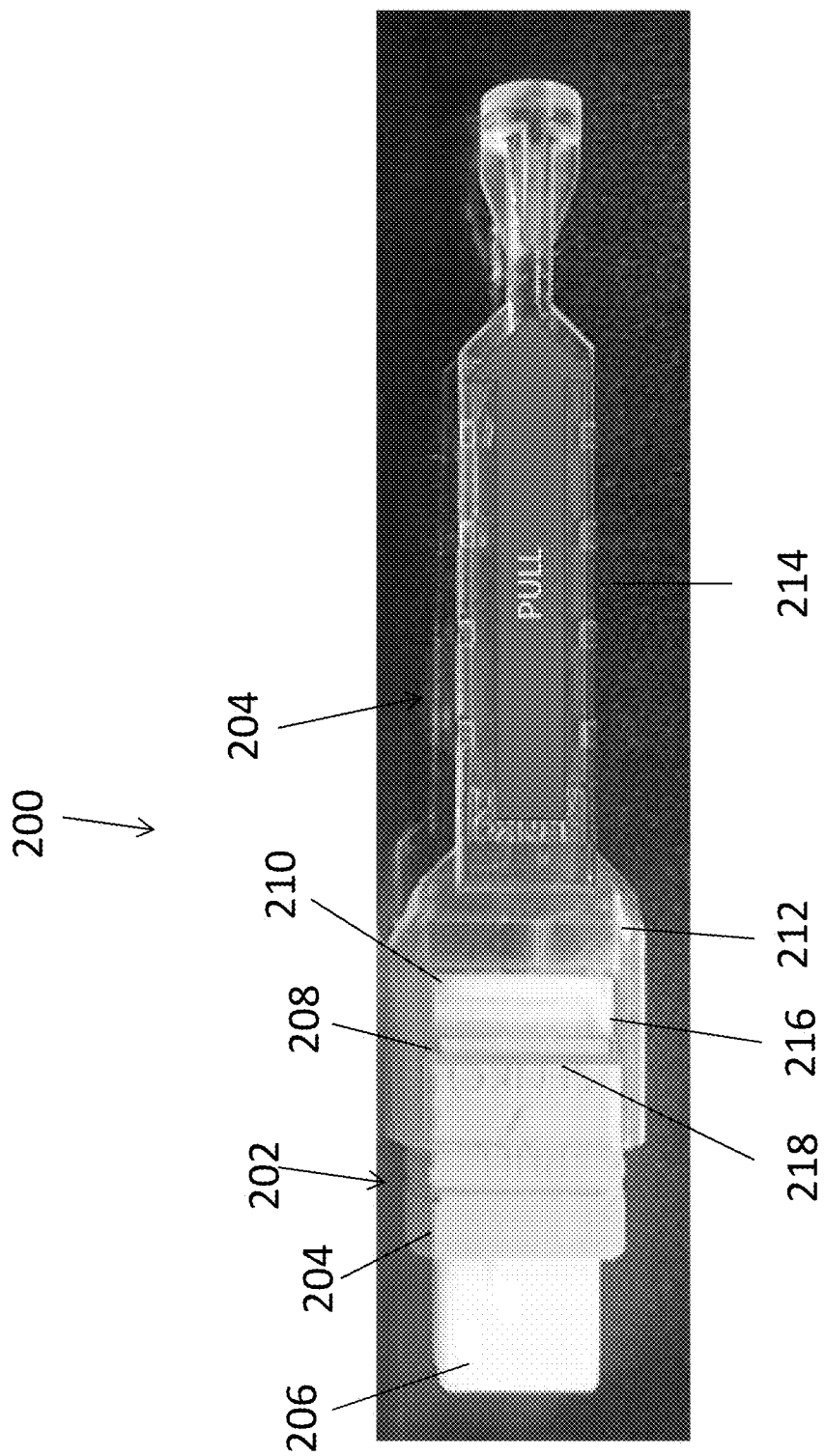
FIG. 9 is a top view of one embodiment of a connector assembly, further illustrating pulling the push-pull tab according to aspects of the present disclosure.

FIG. 9 shows one embodiment of a connector assembly 200, illustrating pulling the push-pull tab 204 that is coupled to the connector 202. The connector 202 includes an outer housing 204 and an inner housing 206. The outer housing 204 has a first protrusion 208 and the inner housing 206 has a second protrusion 210. The push-pull tab 204 include a main body 212 and an extender 214. The main body 212 has a window 216 configured to engage each of the first protrusion 208 and the second protrusion 210, to couple the push-pull tab to each of the inner and outer housings. The window 216 has a first side wall 218 positioned at the front side of the window. When the extender 214 is pulled, as shown in FIG. 9, the first side wall 218 of the window 216 will pull the first protrusion 208 of the outer housing 204.

Figure 10:
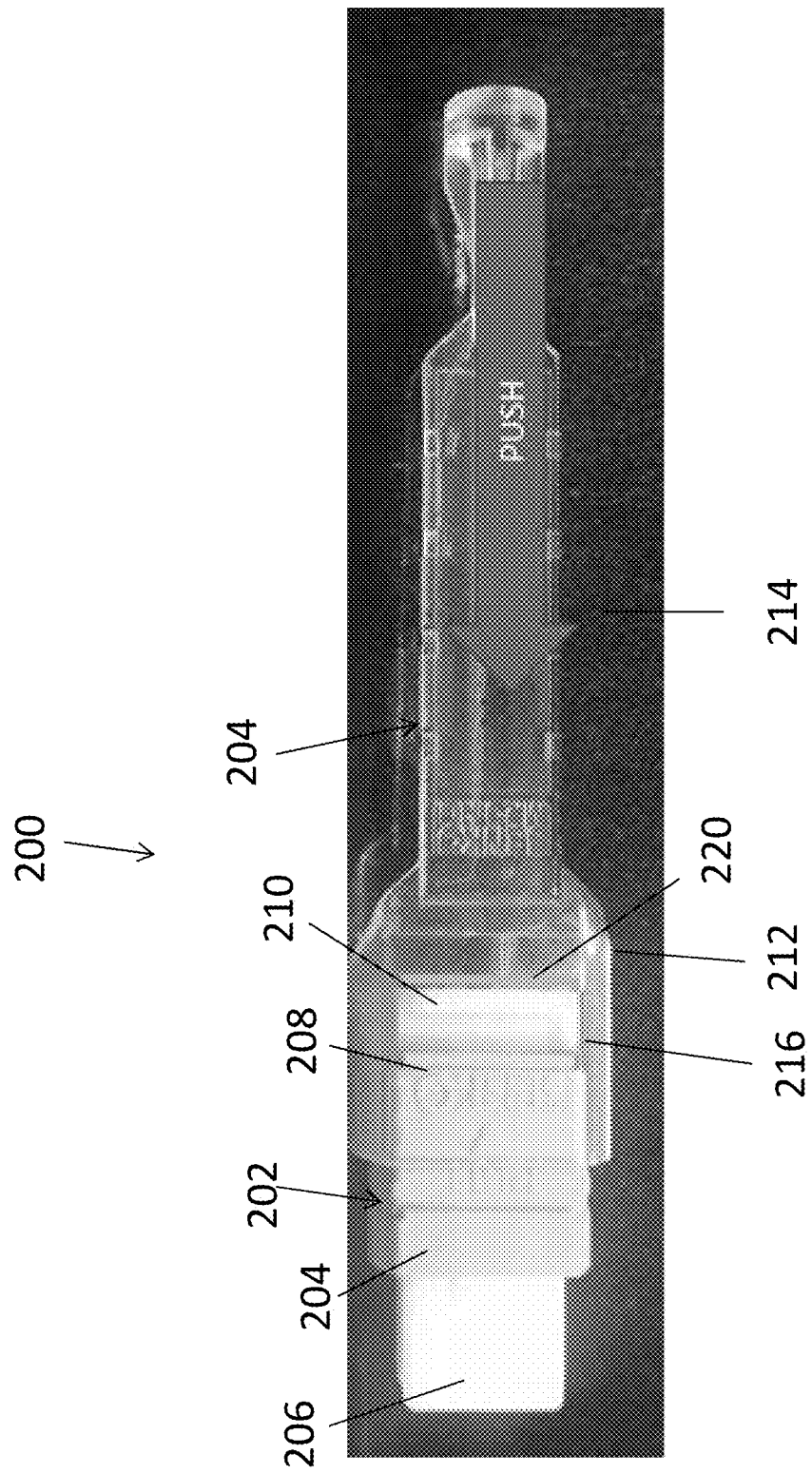
FIG. 10 is a top view of the connector assembly of FIG. 9, further illustrating pushing the push-pull tab according to aspects of the present disclosure.

FIG. 10 further illustrates pushing the push-pull tab 204 of the connector assembly 200. The window 216 has a second side wall 220 at the rear side of the window. When the extender 214 is pushed, as shown in FIG. 10, the second side wall 220 at the rear side of the window 216 will push the second protrusion 210 of the inner housing 206.

Various embodiments described herein use the push and pull mechanism described above in relation with FIGS. 9 and 10.

In various embodiments, it may be desirable to prevent a push-pull tab from moving upward, for example when pushed with a slightly raised motion. In various embodiments, a thin wall may be formed adjacent to the side wall of the window and configured to interact with the protrusion of the inner housing so as to prevent the push-pull tab from moving vertically or in a transverse direction when pushed in, as illustrated in relation to FIGS. 11A to 11F, described below.

FIG. 11A shows another embodiment of a push-pull tab 230 configured to prevent a transverse movement, such as an upward or downward motion of the tab. The push-pull tab 230 comprises a first piece 232 and a second piece 234. The first piece 232 and the second piece 234 are configured to couple to each other to form a passageway for receiving a connector, such as one of the connectors 102 and 150 of FIGS. 3 and 4. The push-pull tab 230 further comprises an extender 236 coupled to the first piece 232. In other embodiments, the extender 236 may be coupled to the second piece 234. The push-pull tab 230 also includes a handle 238 coupled to the extender 236.

The first piece 232 and the second piece 234 may further comprise a plurality of tabs and openings configured to snap with each other, or alternatively another type of fastening mechanism, to couple the first and second pieces, as described for example in relation with FIG. 5.

The first piece 232 has a window 240 configured to receive the first and second protrusions of a connector, such as the connector 102 and 150, so as to couple the push-pull tab to the outer housing and the inner housing of the connector. The window 240 is sized according to a distance between the first protrusion and the second protrusion of the corresponding connector. The second piece 234 also has a respective window 242. Similar to the first window 240 positioned at the top portion of the push-pull tab 230, the second window 242 is positioned at the bottom portion of the push-pull tab. The window 242 is also sized to receive respective protrusions positioned at the bottom portion of the connector, on the inner and outer housings.

Each of the windows 240 and 242 has a respective side wall 244 and 246 configured to push against a respective protrusion of the inner housing when the push-pull tab is pushed, for example as described in relation with FIG. 10. Further, the first window 240 includes a first thin wall 248 disposed adjacent the side wall 244. The second window 242 also has a second thin wall 250 disposed adjacent the side wall 246. Each of the first thin wall 248 and the second thin wall 250 extends substantially parallel to the top surface of the respective window and substantially perpendicular to the respective adjacent side wall of the window.

Figure 11C:
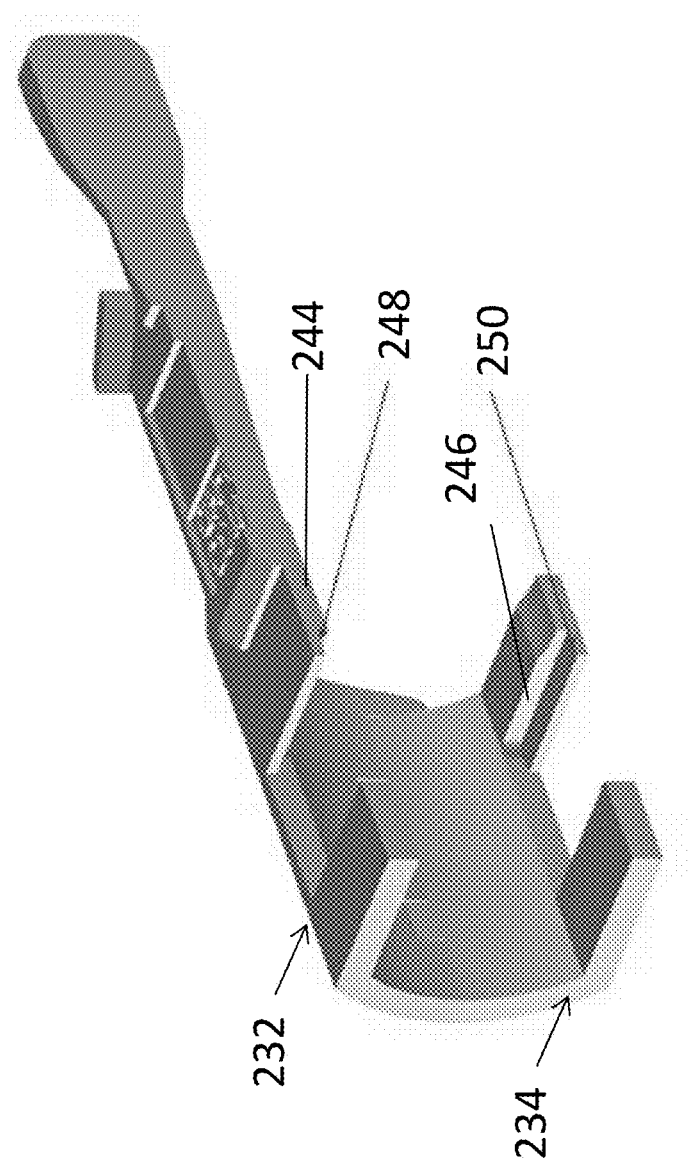
Figure 11D:
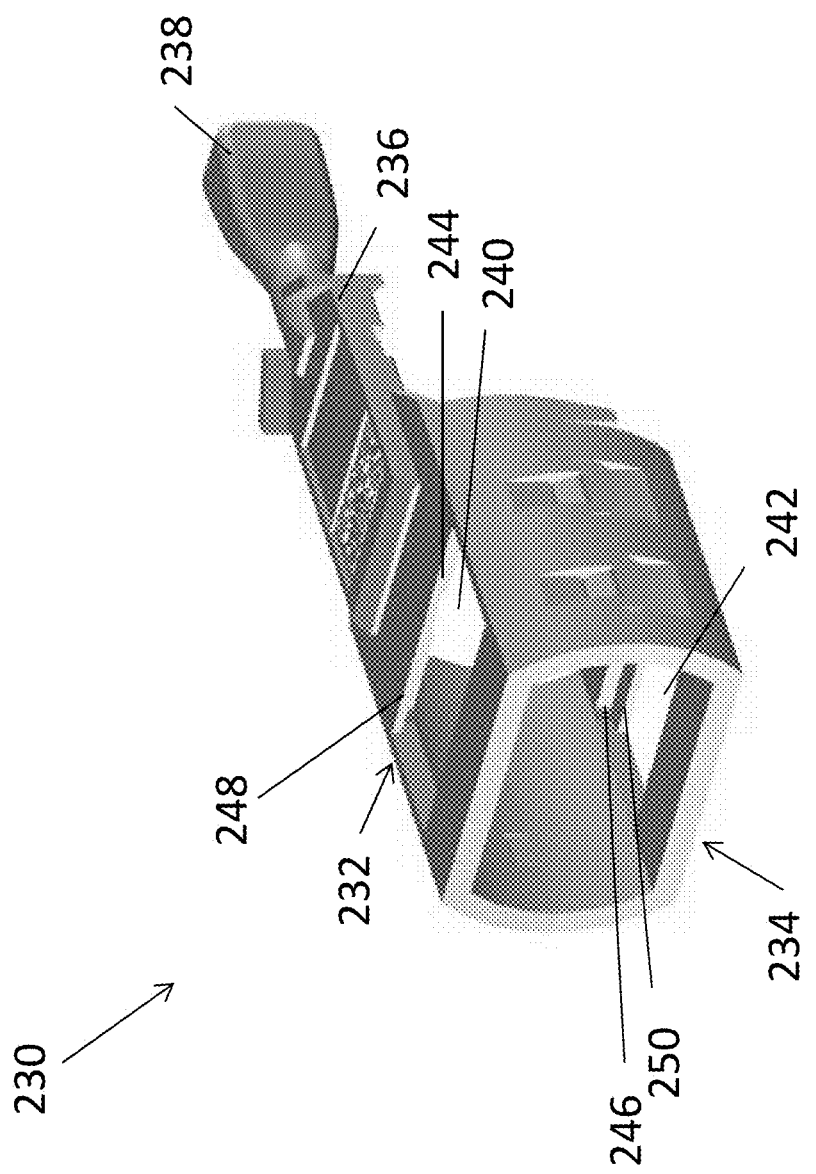

FIG. 11B is another perspective view of the push-pull tab 230, further showing the side wall 244 and the thin wall 248 of the first piece 232. FIG. 11C shows a section of the push-pull connector 230, further showing a section of the side wall 244 and the first thin wall 248 of the first piece 232, as well as a section of the side wall 246 and the second thin wall 250 of the second piece 234. FIG. 11D is a perspective view of the push-pull tab 230 with the first piece 232 coupled to the second piece 234 to form a passageway for the connector. In this embodiment, the push-pull tab comprises two pieces. In other embodiments, the push-pull tab having the thin walls may be a hinged push-pull tab, as described for example in relation to FIG. 12A.

Figure 11E:
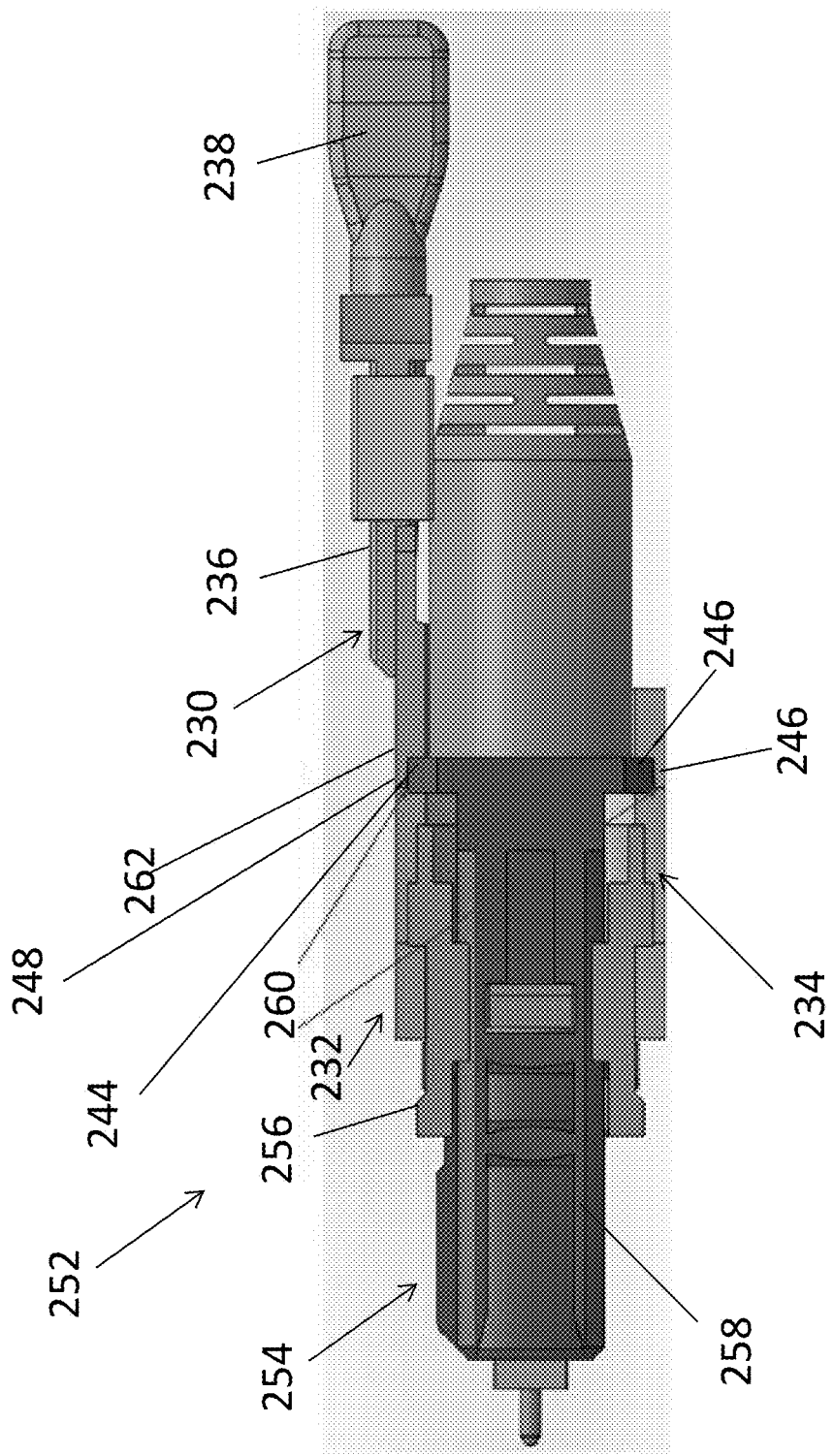
FIG. 11E is a side cross-sectional view of a connector assembly including the push-pull tab of FIGS. 11A to 11D according to aspects of the present disclosure.

FIG. 11E shows one embodiment of a connector assembly 252, illustrating the push-pull tab 230 that is coupled to a connector 254. The connector 254 includes an outer housing 256 and an inner housing 258. The inner housing 258 has at least one protrusion 260. The push-pull tab 230 includes a main body 262 and an extender 236. A side wall 244 and a thin wall 248 are disposed at the rear side of the window of the first piece 232. Similarly, a side wall 246 and a thin wall 250 are disposed at the rear side of the window of the second piece 234. When the extender 236 is pushed, each of the side walls 244 and 246 will push the protrusion 260 of the inner housing 258. Moreover, the thin walls 248 and 250 are configured to prevent a transverse movement, including upward and downward movements, of the push-pull tab as it is pushed.

Figure 12A:
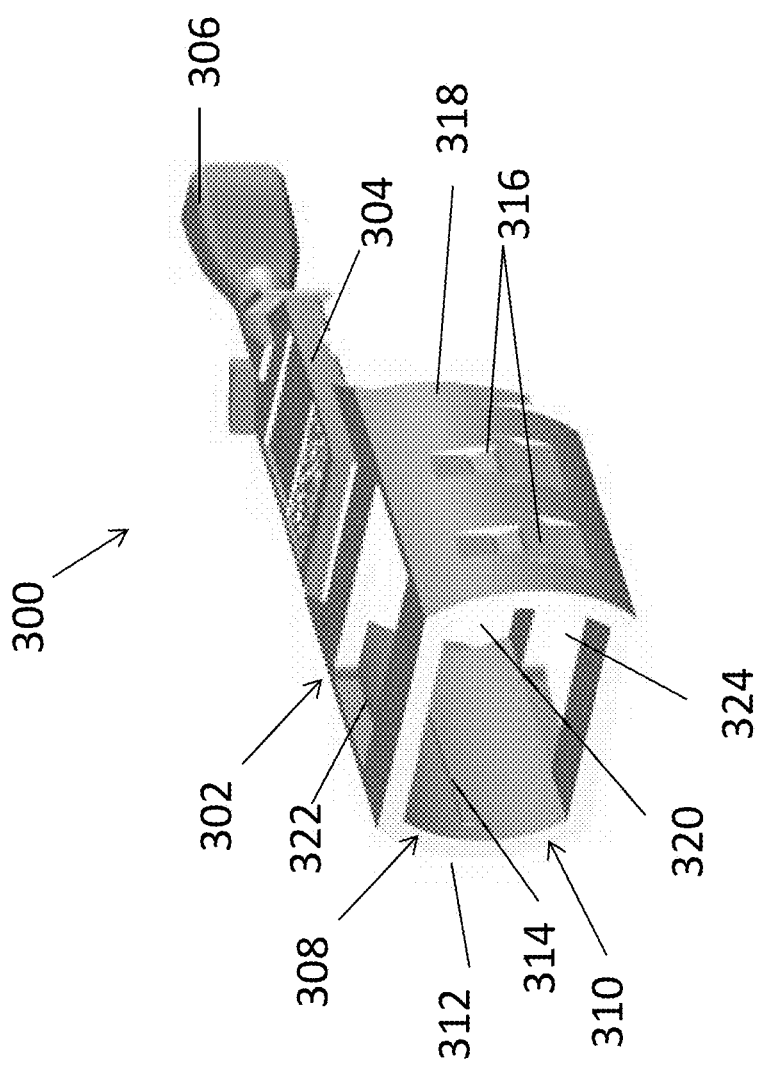
FIG. 12A is a perspective view of a hinged push-pull tab in a closed configuration, according to aspects of the present disclosure.

FIG. 12A shows another embodiment of a push-pull tab 300 that is hinged. The push-pull tab 300 includes a main body 302, an extender 304 coupled to the main body and a handle 306 coupled to the extender. The main body 302 may include a first piece 308 and a second piece 310. The extender 304 is coupled to the first piece 308 that is disposed at the top of the main body 302. In other embodiments, the extender 304 may be coupled to the second piece 310. In various embodiments, the extender may be formed integrally with one of the first piece and the second piece.

Referring again to FIG. 12A, the first piece 308 and the second piece 310 are coupled to each other on one side 312 of the main body 302 by a joint 314, thereby forming a hinged main body configured to rotate around the joint. The main body 302 is configured to be closed using two snap fit structures 316 disposed on a side 318 of the main body. In other embodiments, a different number of snap fit structures may be used. Each snap fit structure 316 may be comprised of two portions, each disposed respectively on the first piece 308 and the second piece 310, and configured to couple to each other to close the main body 302. In some embodiments, the side 318 may be closed using another type of coupling structure. The first piece 308 and the second piece 310 that are joined at side 312 may be closed at the opposite side 318 to form a passageway 320 for receiving a connector, such as one of the connectors 102 and 150 of FIGS. 3 and 4.

The first piece 308 has a window 322 configured to receive the first and second protrusions of a connector, such as the connector 102 and 150, so as to couple the push-pull tab to the outer housing and the inner housing of the connector. The window 322 is sized according to a distance between the first protrusion and the second protrusion of the corresponding connector. The second piece 310 also has a respective window 324. Similar to the first window 322 positioned at the top portion of the push-pull tab 300, the second window 324 is positioned at the bottom portion of the push-pull tab. The window 324 is also sized to receive respective protrusions positioned at the bottom portion of the connector, on the inner and outer housings. In this embodiment, the push-pull tab 300 has two windows on opposite sides of the push-pull tab. In other embodiments, one of the first piece or the second piece may have a window for coupling to the inner and outer housings of the connector.

Figure 12B:
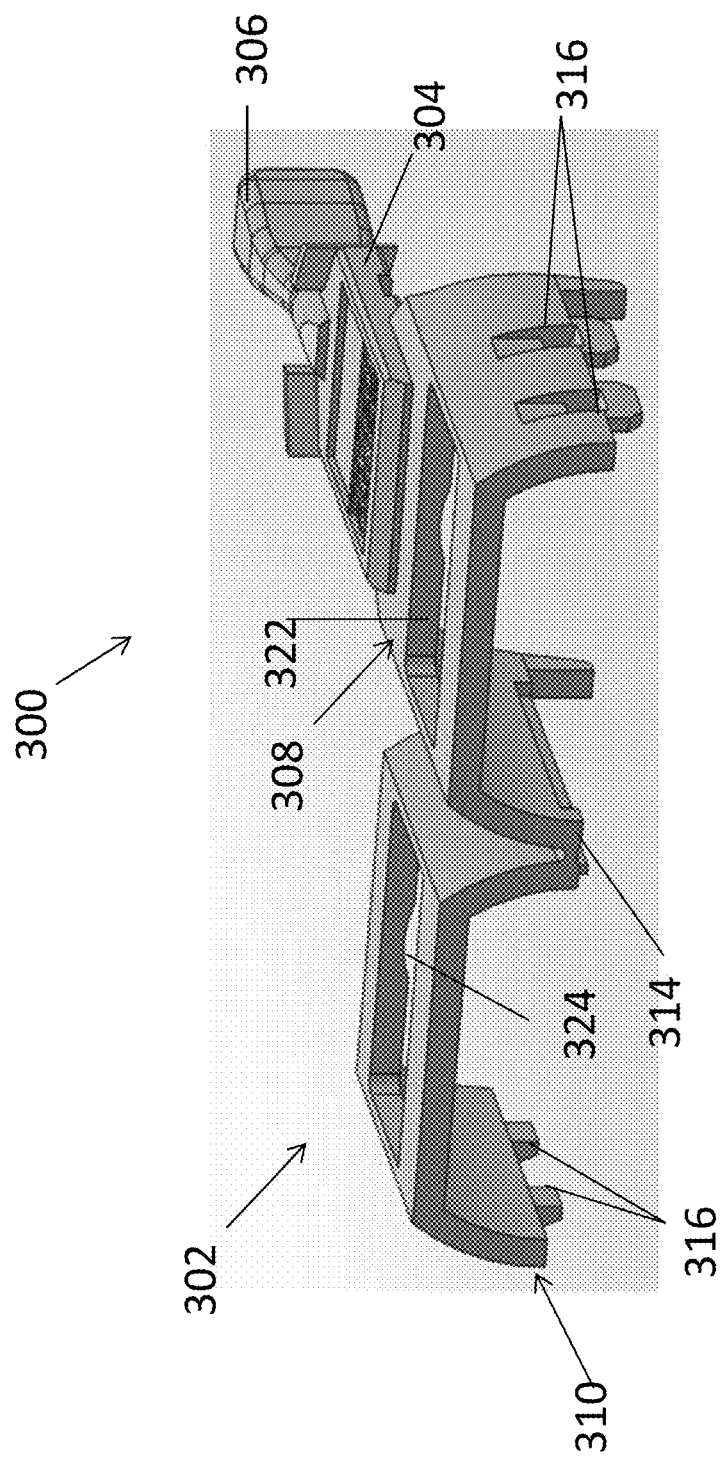
FIG. 12B is a perspective view of the hinged push-pull tab of FIG. 12A in an open configuration, according to aspects of the present disclosure.

FIG. 12B shows the push-pull tab 300 open on side 318. The first piece 308 and the second piece 310 are coupled at the joint 314 and decoupled at the opposite side 318 by the snap fit structures 316. The ability to open the push-pull tab 300 allows easily removing the push-pull tab from a connector or changing a connector.

Figure 13:
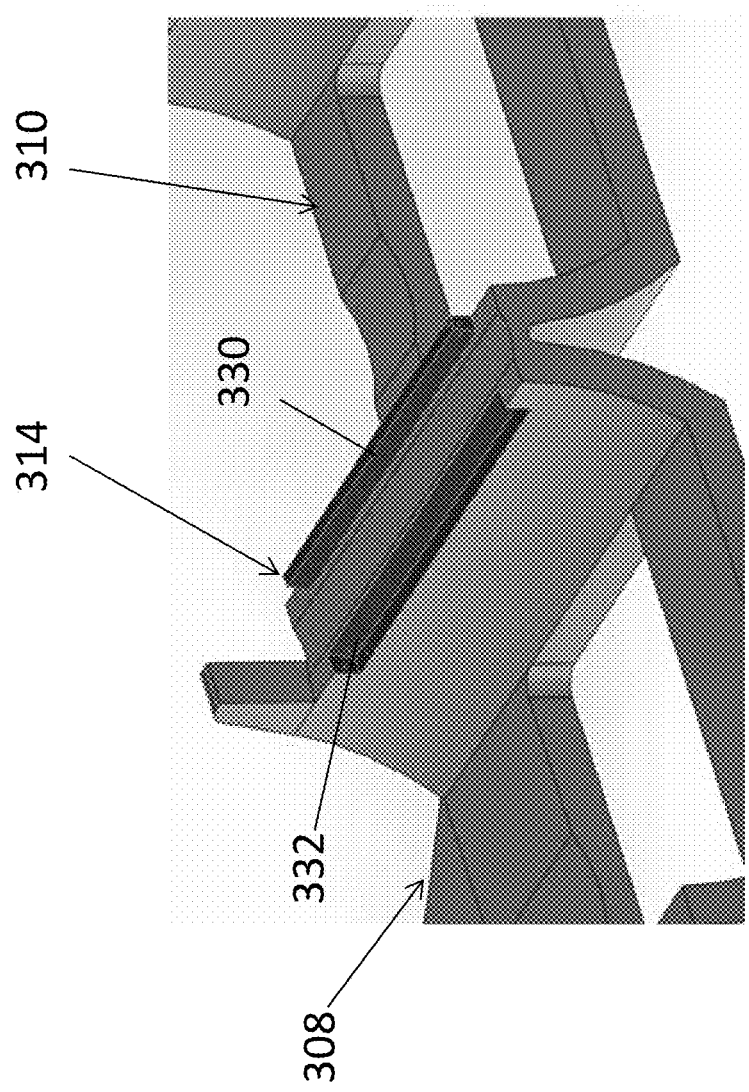
FIG. 13 is a detail view of one embodiment of a joint of the hinged push-pull tab of FIG. 12 according to aspects of the present disclosure.

FIG. 13 shows one embodiment of the joint 314. The joint 314 includes a rib 330 and a corresponding groove 332. The rib 330 is disposed on the second piece 310 and the groove is disposed on the first piece 308. In other embodiments, the rib 330 may be disposed on the first piece 308 and the groove may be disposed on the second piece 310. The rib 330 fits within the groove 332 when the main body 302 is closed by coupling the first and second pieces on the side opposite to the joint 314.

Figure 14A:
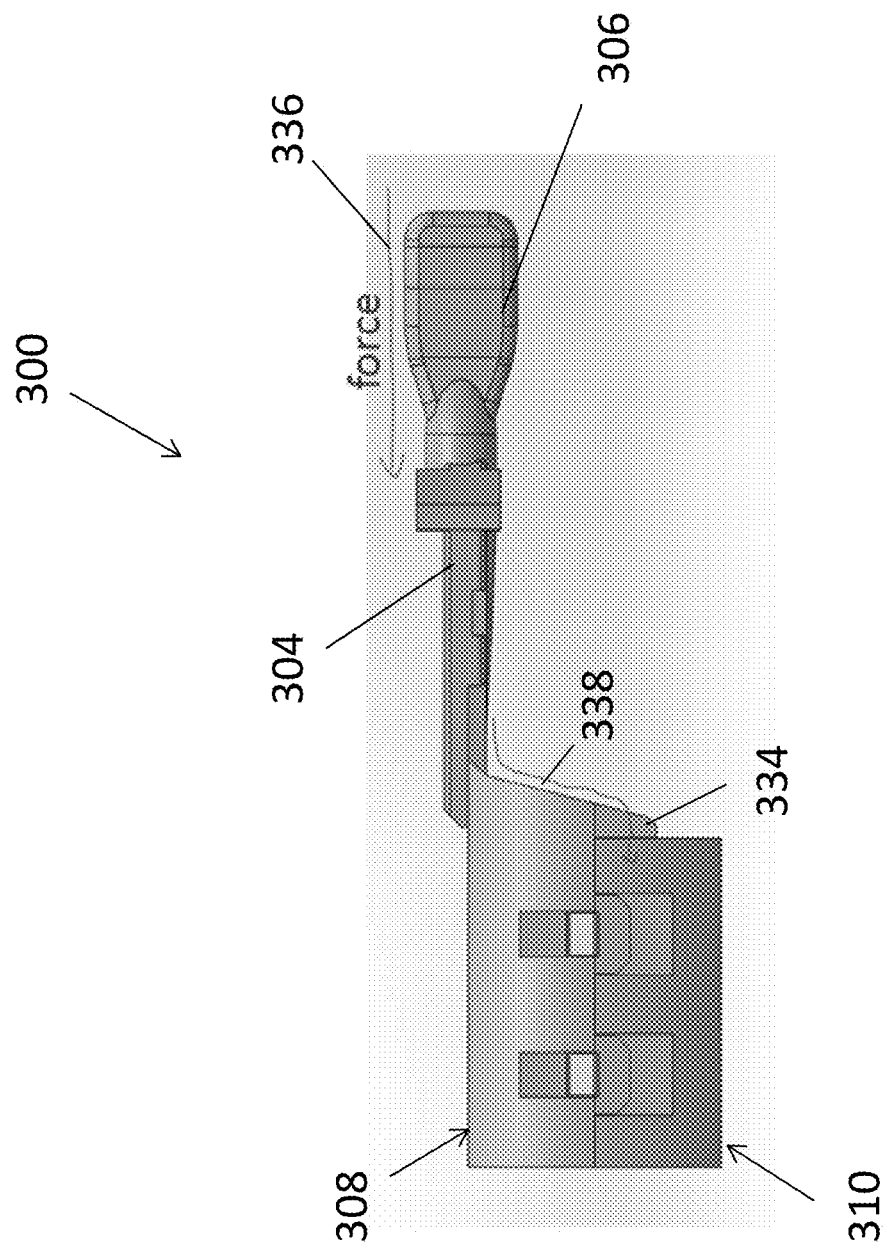
FIG. 14A is a side view of the hinged push-pull tab of FIG. 12, further illustrating protrusions configured to distribute the pushing force to the bottom piece according to aspects of the present disclosure.

FIG. 14A is a side view of the push-pull tab 300, further showing a protrusion 334 formed at one end of the first piece 308. The extender 304 is coupled to the first piece 308 to allow pushing the push-pull tab 300. In other embodiments, the extender and the first piece may be formed integrally. In various embodiments, the protrusion 334 may be formed on the piece which is coupled to or formed integrally with the extender. The protrusion 334 is further configured to extend behind the second piece 310 when the first piece 308 is coupled to the second piece to close the main body 302 of the push-pull tab 300. The protrusion 334 is configured to distribute the force 336 of pushing the push-pull tab 300 across both the first and second pieces. Thus, the protrusion 334 provides support to the bottom second piece 310 as the top first piece 308 is pushed using the extender 304, as illustrated by the arrow 338. When a user pushes the push-pull tab 300 using the extender 304 through the upper piece 308, the protrusion 334 facilitates pushing the bottom piece 310.

Figure 14C:
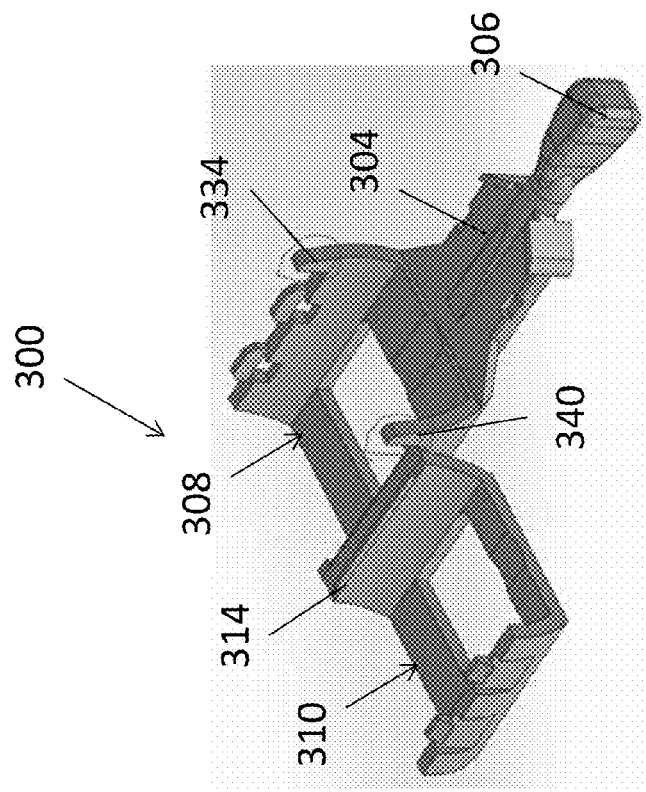
FIGS. 14B and 14C are perspective views of the hinged push-pull tab of FIG. 12 according to aspects of the present disclosure.
Figure 14B:
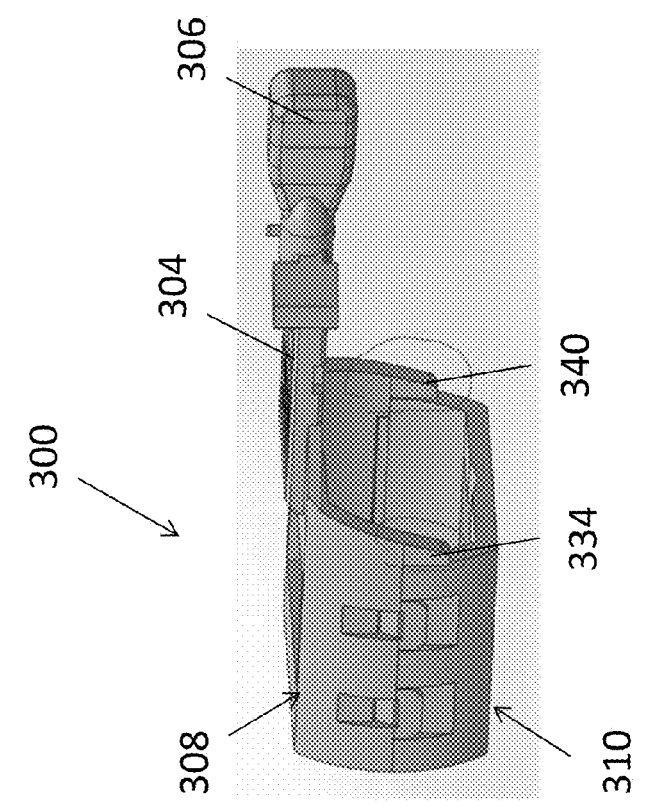

FIG. 14B is a perspective view of the push-pull tab 300, further showing a first protrusion 334 and a second protrusion 340 formed at one end of the first piece and extending behind the second piece. The protrusions facilitate pushing the second piece as the extender coupled to the first piece is pushed. FIG. 14C is a perspective view of the push-pull tab 300 in an open configuration, showing the first protrusion 334 and the second protrusion 340 formed on the first piece 308.

Various features described above in relation to the single piece push-pull tab 104 may also be included in embodiments of the two piece push-pull tab, including the hinged push-pull tab. Further, various features described above in relation to the two piece push-pull tab, including the hinged push-pull tab 300, may be included in embodiments of the single piece push-pull tab.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera As a non-limiting example, each range discussed herein can be readily broken down into a lower third, middle third and upper third, et cetera As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The invention claimed is:

1. An optical fiber connector assembly comprising:
a connector having an outer housing and an inner housing, the inner housing extending beyond a rear end of the outer housing, the outer housing having a first protrusion and the inner housing having a second protrusion positioned at a distance from the first protrusion; and
a push-pull tab comprising a first piece and a second piece configured to couple to each other so as to form a passageway for receiving the connector, the push-pull tab further comprising an extender coupled to one of the first piece and the second piece, at least one of the first piece and the second piece having a window sized according to the distance between the first protrusion and the second protrusion and configured to receive the first protrusion and the second protrusion so as to couple the push-pull tab to the outer housing and the inner housing,
wherein the first piece includes a plurality of tabs and the second piece includes a plurality of openings, the plurality of tabs being configured to snap into the plurality of openings so as to lock the first piece to the second piece.

2. The optical fiber connector assembly of claim 1, wherein the connector is an MPO connector.

3. The optical fiber connector assembly of claim 1, wherein the window has a first side wall configured to pull the first protrusion when the push-pull tab is pulled, and a second side wall configured to push the second protrusion when the push-pull tab is pushed.

4. The optical fiber connector assembly of claim 1, wherein the first protrusion and the second protrusion are substantially parallel.

5. The optical fiber connector assembly of claim 4, wherein the first protrusion and the second protrusion are oriented in a direction substantially orthogonal to a longitudinal axis of said connector.

6. The optical fiber connector assembly of claim 1, wherein the push-pull tab further comprises a thin wall configured to push against the second protrusion to prevent a transverse movement of the push-pull tab when the push-pull tab is pushed.

7. The optical fiber connector assembly of claim 1, wherein the extender is coupled to a rear portion of one of the first piece and the second piece.

8. The optical fiber connector assembly of claim 1, wherein the first piece includes a first plurality of side walls having the plurality of tabs thereon, and the second piece includes a second plurality of side walls having the plurality of openings thereon.

9. The optical fiber connector assembly of claim 1, wherein the push-pull tab comprises a joint coupling the first piece and the second piece.

* * * * *